United States Patent [19]

Ohtsuki

[11] Patent Number: 5,471,621
[45] Date of Patent: Nov. 28, 1995

[54] INFORMATION PROCESSING SYSTEMS HAVING A MAIN CPU AND A SUB-CPU WHICH CONTROLS THE OVERALL SYSTEM TO ACHIEVE POWER SAVINGS

[75] Inventor: Tetsuji Ohtsuki, Yokohama, Japan

[73] Assignee: Matsushita Electric Industrial Co., Ltd., Osaka, Japan

[21] Appl. No.: 878,467

[22] Filed: May 5, 1992

[30] Foreign Application Priority Data

May 9, 1991  [JP]  Japan ................................ 3-104361

[51] Int. Cl.⁶ ........................................... G06F 1/32
[52] U.S. Cl. ................................. 395/750; 364/707
[58] Field of Search ........................ 395/750, 575, 395/550; 371/66, 12, 14; 365/226, 227, 228; 364/707

[56] References Cited

U.S. PATENT DOCUMENTS

| | | | |
|---|---|---|---|
| 4,851,987 | 7/1989 | Day | 395/550 |
| 4,907,183 | 3/1990 | Tanaka | 364/707 |
| 5,083,266 | 1/1992 | Watanabe | 395/275 |
| 5,142,684 | 8/1992 | Perry et al. | 395/750 |
| 5,167,024 | 11/1992 | Smith et al. | 395/375 |
| 5,175,845 | 12/1992 | Little | 395/550 |
| 5,220,671 | 6/1993 | Yamagishi | 395/750 |
| 5,230,074 | 7/1993 | Canova, Jr. et al. | 395/750 |
| 5,396,635 | 3/1995 | Fung | 395/800 |
| 5,404,546 | 4/1995 | Stewart | 395/750 |
| 5,410,711 | 4/1995 | Stewart | 395/750 |

FOREIGN PATENT DOCUMENTS 0459247  4/1991  European Pat. Off. ......... G06F 1/32

*Primary Examiner*—Jack B. Harvey
*Assistant Examiner*—Glenn A. Auve
*Attorney, Agent, or Firm*—Stevens, Davis, Miller & Mosher

[57] ABSTRACT

An information processing system in which a sub-CPU is provided besides a main CPU to carry out those kinds of processing and power supply control that may be executed at time intervals of a short period, so that the power consumption of the information processing system can be reduced without lowering the processing speed of the information processing system. The sub-CPU of a type operating at a low speed, driven by a low voltage and consuming a small amount of power carries out those kinds of processing including monitoring an input from a keyboard, counting the output of a timer and monitoring and controlling a power supply control circuit, and, during waiting arrival of a key input, the main CPU is placed in its halt mode consuming a very small amount of power. The sub-CPU instructs to selectively turn off the power supply for an input/output unit not in use among a display unit, a modem, an FDD, an extension slot, etc., whereby the power consumption of the information processing system can be reduced without lowering the processing speed of the information processing system.

5 Claims, 6 Drawing Sheets

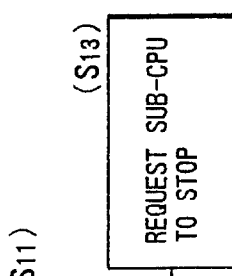
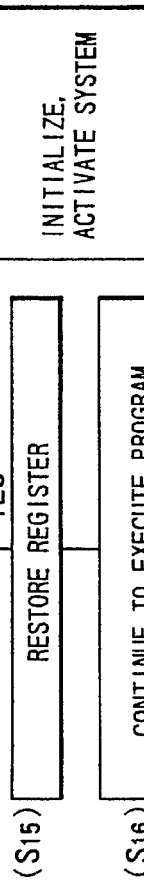
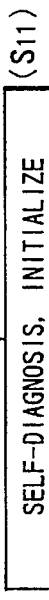
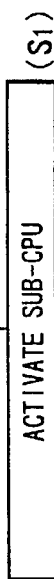
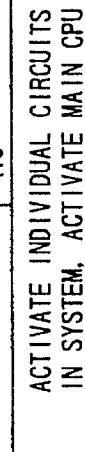
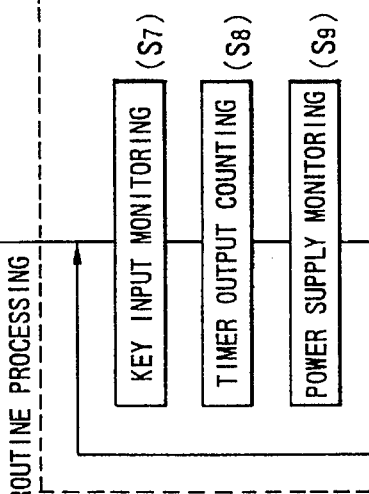
FIG.2

INFORMATION PROCESSING SYSTEMS HAVING A MAIN CPU AND A SUB-CPU WHICH CONTROLS THE OVERALL SYSTEM TO ACHIEVE POWER SAVINGS

BACKGROUND OF THE INVENTION

This invention relates to an information processing system of a battery driven type, for example, a portable terminal equipment or a portable personal computer.

In a prior art information processing system of this kind, a single CPU only was used to carry out all the kinds of processings including application program execution, data communication control, keyboard input monitoring, timer output counting, and power supply monitoring and control. Further, the prior art information processing system was constructed so that, when the power supply was turned on and maintained in the on state, the main CPU was continuously placed in its operation mode consuming a large amount of power, and the power supply voltage had to be supplied also to input/output units not in use.

As described above, in the prior art information processing system in which the CPU carried out all the kinds of processings, those kinds of processing, such as, key input monitoring, timer output counting and power supply monitoring, that are required to be executed at time intervals of a short period, had also to be executed during execution of a program such as an application program. For example, these kinds of processings had to be executed at time intervals of 10 msec while interrupting the execution of the application program by the main CPU.

Further, because the main CPU consuming a large amount of power had to be continuously placed in its operation mode even when the system was waiting arrival of a key input, a large amount of power was wastefully consumed especially in the case of the portable information processing system designed primarily for the purpose of data input processing.

Further, whenever the power supply for the information processing system proper was turned on, the power supply voltage was supplied to all the input/output units in the system. Thus, the power was wastefully supplied also to the input/output units not in use. For example, even when the system was working for data communication for a long time through a modem, the power supply voltage had to be supplied to all the other input/output units including a display unit, a floppy disk drive (referred to hereinafter as an FDD), and an extension slot connected to an external circuit.

SUMMARY OF THE INVENTION

With a view to solve the prior art problems pointed out above, it is an object of the present invention to provide an information processing system in which a sub-CPU of a type operating at a low speed, driven by a low voltage and consuming a small amount of power is provided in addition to a main CPU, to carry out those kinds of processings required to be executed at time intervals of a short period, so that the load on the main CPU can be lightened, and the sub-CPU can carry out the key input monitoring. In the information processing system of the present invention, the main CPU is maintained in its halt mode when the system is awaiting arrival of a key input, and the power supply for the individual input/output units is selectively turned on and off so as not to supply the power supply voltage to those input/output units not in use, so that the power consumption of the entire system can be reduced, the period of time of continuous operation by being driven by a battery can be extended, and the speed of processing by the system can be made faster.

The information processing system according to the present invention comprises a main CPU capable of operating at a high speed, a sub-CPU of a type operating at a low speed, driven by a low voltage and consuming a small amount of power, a memory unit storing programs and data, input/output units including a keyboard and a display unit, and a power supply control circuit, the sub-CPU carrying out those kinds of processings including key input monitoring, timer output counting and power supply monitoring that are required to be executed at time intervals of a short period.

Further, in the information processing system of the present invention, the sub-CPU carries out the function of key input monitoring, and, while the system is waiting for the arrival of a key input, the main CPU is placed in its halt mode consuming a very small amount of power, and the power supply for those input/output units not in use is turned off.

According to the information processing system of the present invention comprising the main CPU capable of operating at a high speed, and the sub-CPU operating at a low speed, driven by a low voltage and consuming a small amount of power, the sub-CPU carries out the function of key input monitoring, and, while the system is waiting for the arrival of a key input, the main CPU is placed in its halt mode consuming a very small amount of power, so that the sub-CPU carries out those kinds of processings that are required to be executed at time intervals of a short period while the main CPU is carrying out those kinds of processings that are to be executed at high speed. Thus, the main CPU and the sub-CPU participate in the predetermined kinds of processings respectively, so that the power consumption of the entire system can be reduced without lowering the processing speed of the entire system. Also, by selectively turning on and off the power supply for the individual input/output units, the power consumption can be further reduced.

BRIEF DESCRIPTION OF THE DRAWINGS

FIG. 2 is a flow chart showing the operation of a first embodiment of the present invention when the power supply is turned on.

DESCRIPTION OF THE PREFERRED EMBODIMENTS

First Embodiment

Figure 1:
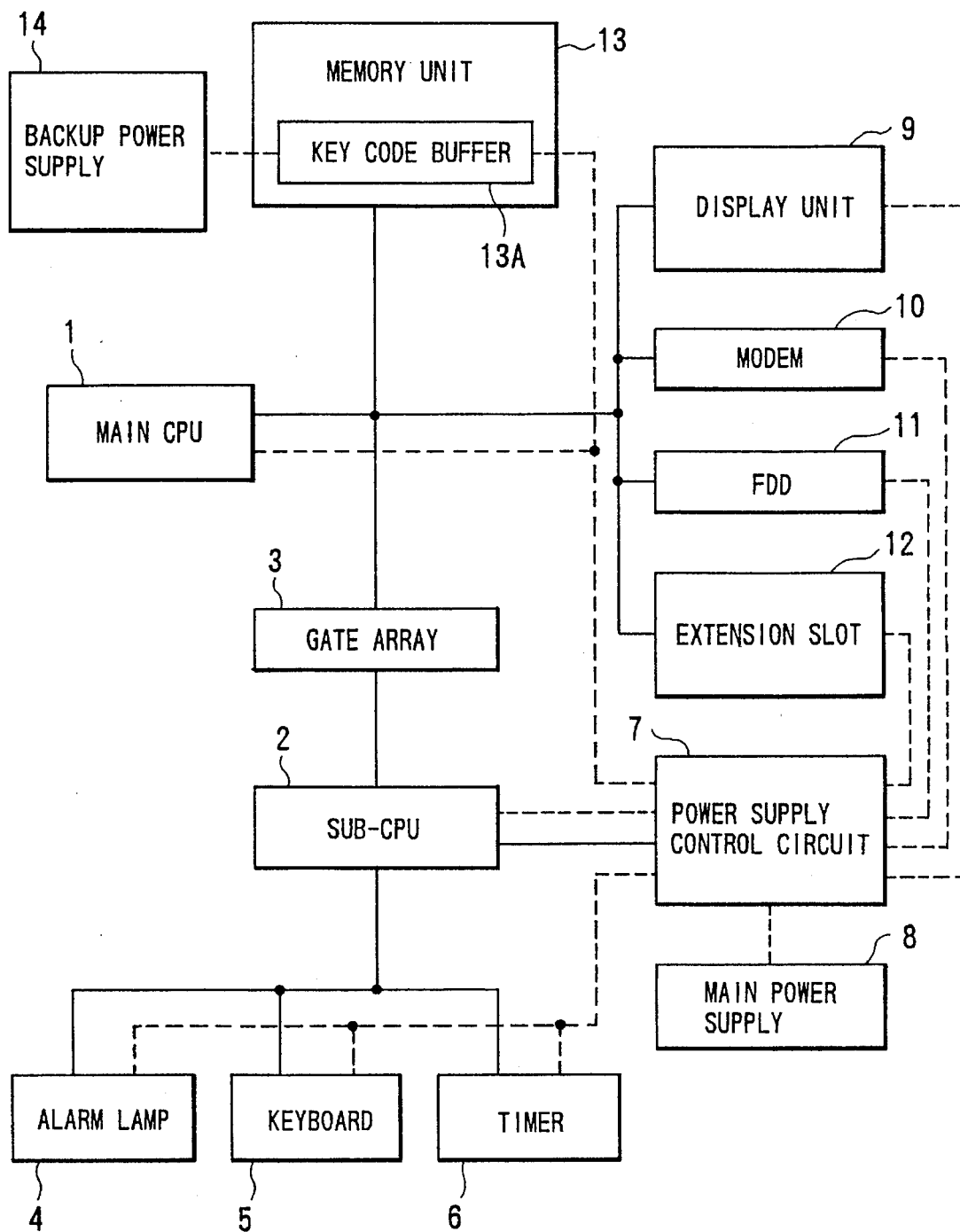
FIG. 1 is a block diagram showing the structure common to all of the embodiments of the information processing system according to the present invention.

The structure and operation of a first embodiment of the information processing system according to the present invention will now be described by reference to FIGS. 1, 2, 3 and 4. FIG. 1 is a block diagram showing the structure of the first embodiment of the present invention, and this structure is common to a second and a third embodiment which will be described later. Referring to FIG. 1, a main CPU 1 can be placed in both an operation mode where the main CPU 1 can operate at a high speed and a halt mode where the power consumption of the main CPU 1 is very small. The term "halt mode" is used herein to designate such a mode in which the clock generator ceases to generate its clock output, but the register holds its contents, so that the main CPU 1 is ready to shift to its operation mode. For example, although the current consumption of the main CPU 1 in its operation mode is usually about 100 mA, its current consumption in the halt mode is only about several-hundred µA.

A sub-CPU 2 of a type operating at a low speed, driven by a low voltage and consuming a small amount of power is connected to the main CPU 1 through a gate array 3. The current consumption of this sub-CPU 2 is very small as compared to that of the main CPU 1 in the operation mode and is in the order of, for example, 1 mA. The sub-CPU 2 is also connected to an alarm lamp 4, a keyboard 5, a timer 6 and a power supply control circuit 7 so as to carry out the functions of key input monitoring, timer output counting and power supply monitoring and control. In the event of occurrence of an abnormal operation, the sub-CPU 2 acts to energize the alarm lamp 4. The power supply control circuit 7 is connected to a main power supply 8 which supplies electric power to the system. The power supply for a display unit 9, a modem 10, an FDD 11 and an extension slot 12 can be separately turned on and off.

A main memory unit 13 is in the form of a static RAM, and a backup power supply 14 is connected to the main memory unit 13 so as to hold the memory contents even when the power supply is interrupted. A key code buffer 13A built in the main memory unit 13 stores key codes inputted by depression of keys on the keyboard 5 by the user.

In FIG. 1, the solid connection lines indicate the current flow when the main CPU 1 is in its operation mode, while the broken connection lines indicate the current flow when the sub-CPU 2 is in its operation mode.

The operation of the first embodiment of the information processing system of the present invention will now be described by reference to a flow chart of FIG. 2. This FIG. 2 is a flow chart showing the operation of the first embodiment when the main power supply 8 is turned on.

As soon as the main power supply 8 is turned on, the sub-CPU 2 is first activated in a step S1. Under this condition, the power supply voltage is supplied to the sub-CPU 2 only from the power supply control circuit 7, and no power supply voltage is supplied to the main CPU 1 and other circuits.

Then, in a step S2, the sub-CPU 2 makes self-diagnosis and checks the power supply voltage. When the result of the voltage check proves that the power supply voltage is not normal, as shown at "Yes" in a step S3, an alarm is issued in a step S4, and the supply of the power supply voltage is stopped in a step S5. On the other hand, when the result of the voltage check proves that the power supply voltage is normal, as shown at "No" in the step S3, the sub-CPU 2 instructs the power supply control circuit 7 to turn on the power supply for the individual circuits in the system and also instructs power supply control circuit 7 to activate the main CPU 1 in a step S6.

Steps of routine processing, such as, key input monitoring in a step S7, timer output counting in a step S8, and power supply monitoring in a step S9 are then repeated at time intervals of a short period of, for example, 10 msec under control of the sub-CPU 2.

The main CPU 1 is activated in a step S10. Then, in a step S11, the main CPU 1 makes self-diagnosis and initializes and diagnoses the individual circuits in the system. When the result of the diagnosis proves that any one of these circuits is not normal, as shown at "Yes" in a step S12, the main CPU 1 instructs the sub-CPU 2 to interrupt the power supply in a step S13. The sequence of processing to be carried out when the power supply is interrupted will be described later in a flow chart of FIG. 4.

On the other hand, when the result of the diagnosis by the main CPU 1 proves that all the circuits are normal, as shown at "No" in the step S12, the main CPU 1 checks in a step S14 as to whether or not the so-called resume function is on or off. This resume function refers to such a function that, when the power supply is turned on, the sequence of processing can be resumed or continued from the preceding condition where the power supply was turned off.

In this embodiment, the backup power supply 14 acts to hold the contents of the memory unit 13, so that, when the resume function is on, the sequence of processing can be continued from the power supply turned-off condition again after the power supply is turned on. Thus, because the resume function is on, the register contents that have been saved in the memory unit 13 at the turned-off time of the power supply are restored in a step S15, and the program can be continuously executed in a step S16 subsequent to the power supply turned-off condition. On the other hand, when the resume function is off, as shown at "No" in the step S14, the system is initialized, and the main CPU 1 is activated again in a step S17.

Figure 3:
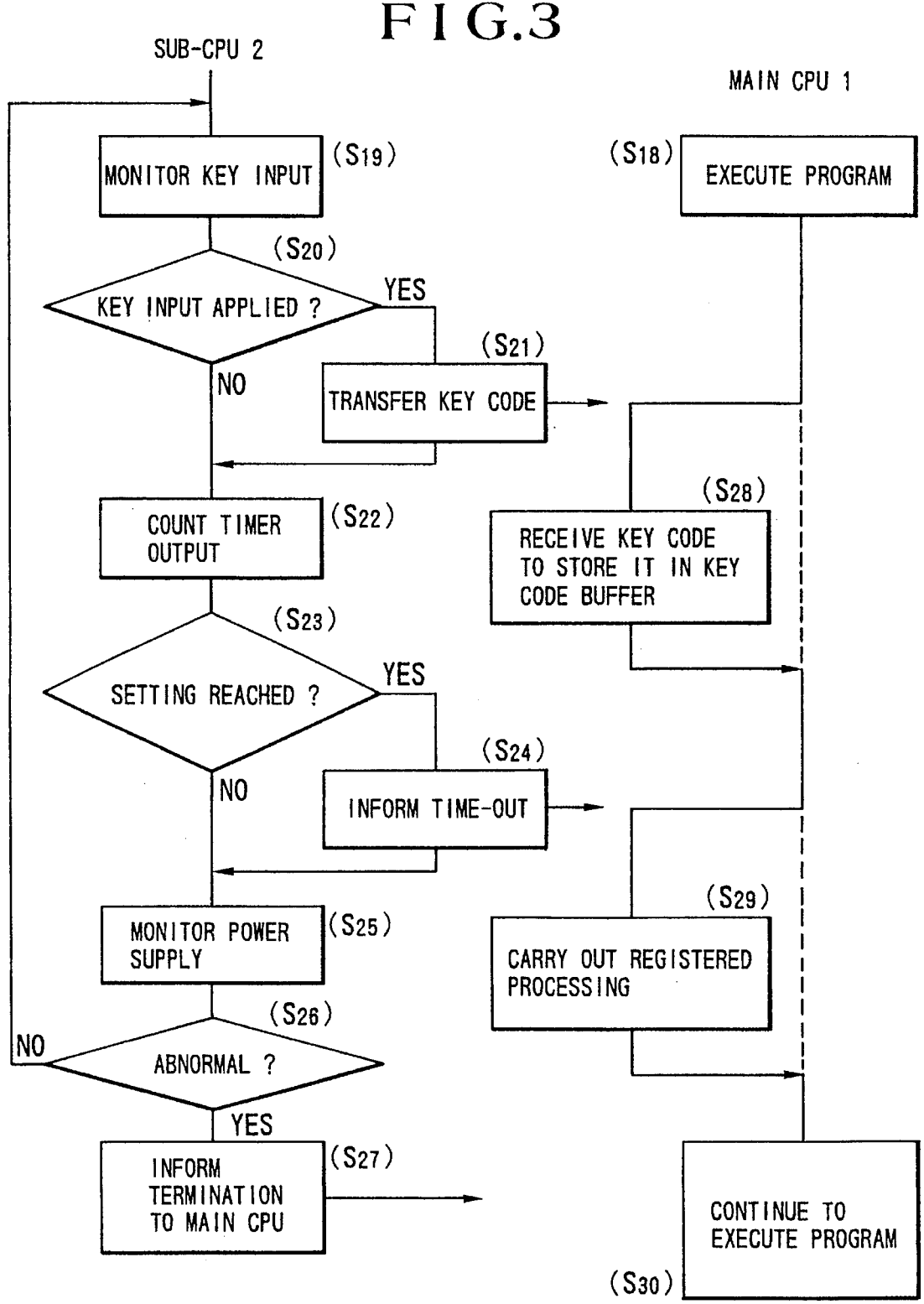
FIG. 3 is a flow chart showing the operation of the first embodiment of the present invention when the system is executing a program.

The operation of the main CPU 1 and the sub-CPU 2 during execution of a program in a usual manner will now be described by reference to a flow chart of FIG. 3. Even when the main CPU 1 is executing a program such as an application program in a step S18, the sub-CPU 2 is executing the key input monitoring in a step S19, the timer output counting in a step S22 and the power supply monitoring in a step S25 at time intervals of a short period of, for example, 10 msec.

When the sub-CPU 2 decides that a key input is applied as shown at "Yes" in a step S20, an interrupt for the key code transfer is requested for the main CPU 1 in a step S21. The main CPU 1 temporarily ceases to execute the program having been executed up to then, and receives the key code from the sub-CPU 2 to store the key code in the key code buffer 13A in the memory unit 13 in a step S28.

Also, when the result of the timer output counting in the step S22 proves that a predetermined period of time has been counted, as shown at "Yes" in a step S23, an interrupt for the time-out is requested for the main CPU 1 in a step S24. Then, in a step S29, the main CPU 1 carries out the pre-registered sequence of processing. When the result of the power supply monitoring in the step S25 proves that the power supply is not normal, as shown at "Yes" in a step S26, the main CPU 1 is informed that the execution of the program is to be terminated in a step S27.

Figure 4:
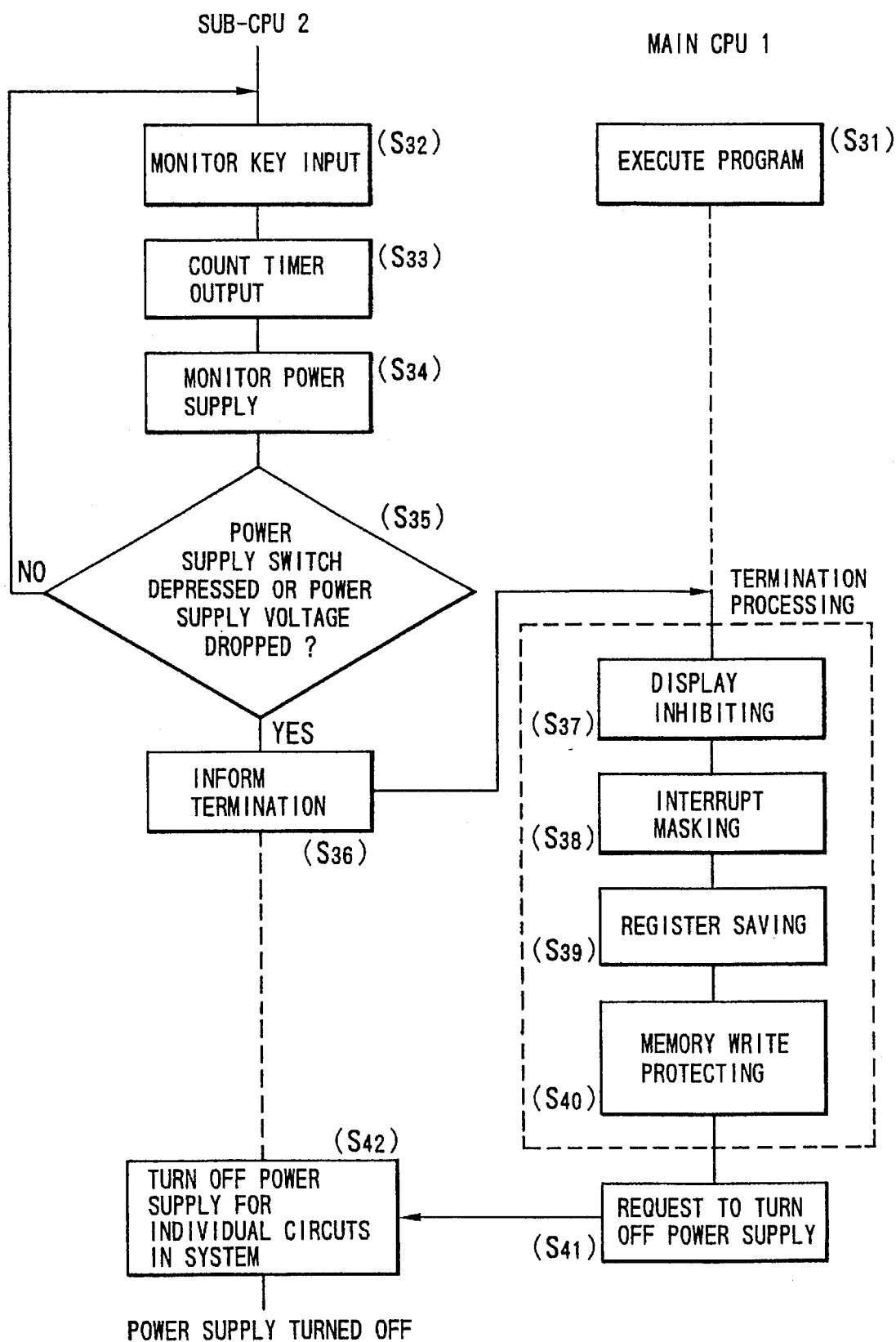
FIG. 4 is a flow chart showing the operation of the first embodiment of the present invention when the power supply is turned off.

The sequence of processing in the event of power supply interruption will be described by reference to a flow chart of FIG. 4. Unless the power supply is not normal, the sequence of processing described above is periodically repeated. The main CPU 1 continuously executes the program in a step S30 after the end of the interrupt processing requested from the sub-CPU 2.

The sequence of processing carried out for the power supply switch-over in this embodiment will now be described, using the flow chart of FIG. 4. Referring to FIG.

4, the sub-CPU 2 is repeating the key input monitoring in a step S32, the timer output counting in a step S33 and the power supply monitoring in a step S34 while the main CPU 1 is executing the program in a step S31.

When the result of the power supply monitoring in the step S34 proves that the power supply switch is turned on or the power supply voltage becomes lower than a predetermined setting, as shown at "Yes" in a step S35, the sub-CPU 2 sends out a program termination message to the main CPU 1 in a step S36.

As soon as the main CPU 1 receives this program termination message from the sub-CPU 2, the main CPU 1 interrupts the execution of the program and carries out a series of termination processings including display inhibiting in a step S37, interrupt masking in a step S38, register contents saving in a step S39 and write protecting for the memory unit 13 in a step S40.

After the preparation for turning off the power supply in the manner described above, this power supply turn-off is requested for the sub-CPU 2 from the main CPU 1 in a step S41. In response to this power supply turn-off requested from the main CPU 1 in the step S41, the sub-CPU 2 instructs the power supply control circuit 7 to turn off the power supply for all the circuits in the system in a step S42.

As described above, the sub-CPU 2 in this embodiment executes those kinds of processings required to be repeated at time intervals of a short period, such as, the key input monitoring, the timer output counting and the power supply monitoring and control, so that the load on the main CPU 1 can be lightened.

Second Embodiment

A second embodiment of the information processing system according to the present invention will now be described by reference to FIGS. 1 and 5. The operation of each individual unit in this second embodiment is the same as that in the first embodiment.

Figure 5:
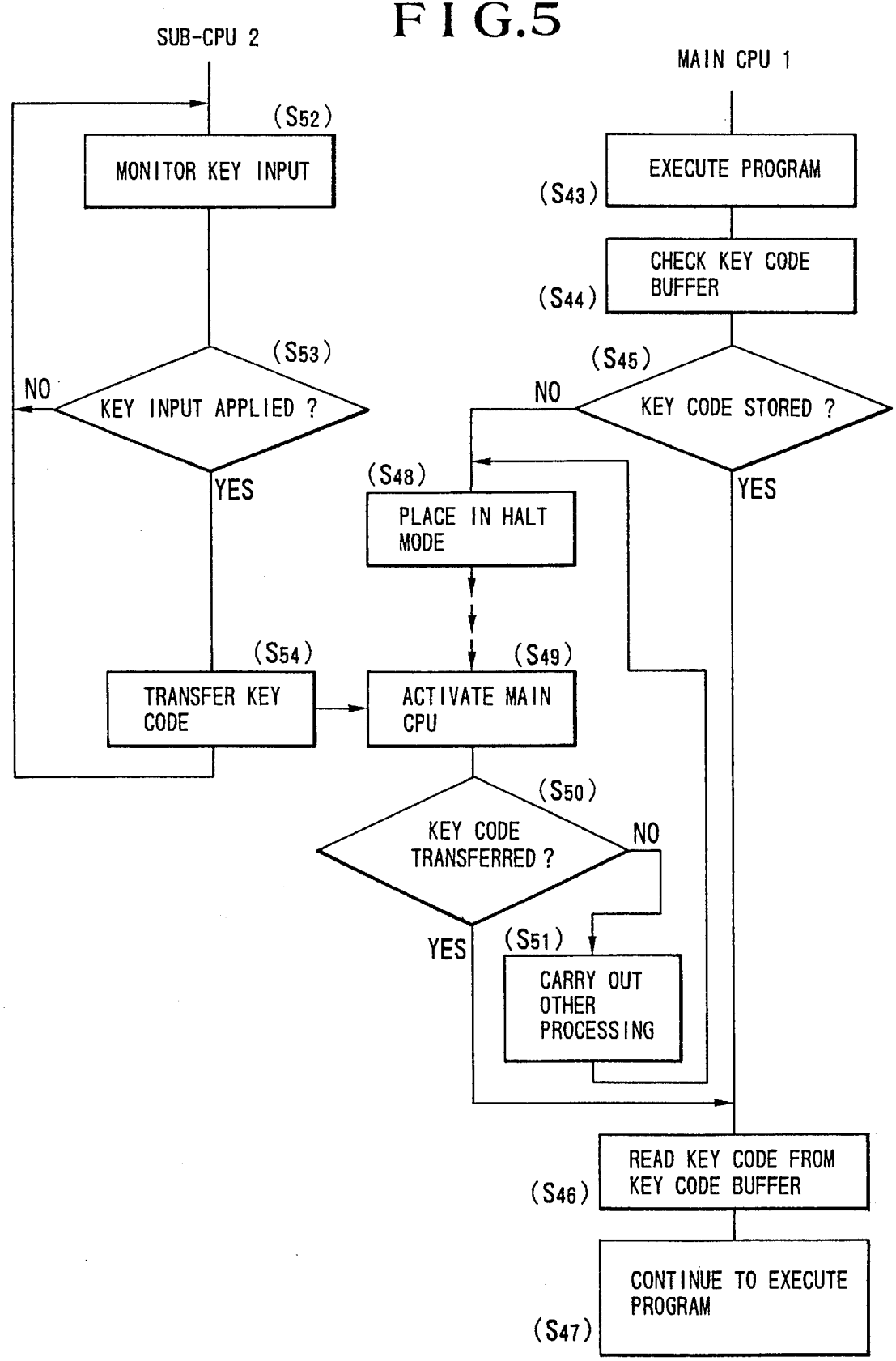
FIG. 5 is a flow chart showing the operation of a second embodiment of the present invention.

FIG. 5 is a flow chart showing the operation of the main CPU 1 and the sub-CPU 2 in the key input mode. When a key input is requested while the main CPU 1 is executing a program in a step S43, the main CPU 1 checks in a step S44 as to whether or not such a key code is already stored in the key code buffer 13A built in the memory unit 13.

When the result of the check proves that such a key code is already stored in the key code buffer 13A, as shown at "Yes" in a step S45, the main CPU 1 reads out the key code from the key code buffer 13A in a step S46 and continues to execute the program in a step S47. On the other hand, when the key code is not stored in the key code buffer 13A, as shown at "No" in the step S45, the main CPU 1 places itself in the halt mode consuming a very small amount of power and waits for an interrupt request applied from the sub-CPU 2 in a step S48.

The sub-CPU 2 is periodically monitoring a key input in a step S52, and, when such a key input is detected, as shown at "Yes" in a step S53, interrupts to request key code transfer for the main CPU 1 in a step S54.

In the flow chart of FIG. 5, the main CPU 1 is activated in a step S49 after the key code transfer in the step S54. However, there are various other factors which will request the interrupt. Therefore, after the main CPU 1 is activated in the step S49, the main CPU 1 checks in a step S50 as to whether or not the key code transfer is the factor requesting the interrupt. When the result of the check in the step S50 proves that the factor requesting the interrupt is other than the key code transfer, as shown at "No" in the step S50, the kind of processing conforming to the factor requesting the interrupt is executed in a step S51, and the main CPU 1 is placed in the halt mode again in the step S48. On the other hand, when the result of the check proves that the key code transfer is the factor requesting the interrupt, as shown at "Yes" in the step S50, the main CPU 1 reads out the key code from the key code buffer 13A in the step S46 and continues to execute the program in the step S47.

As described above, while awaiting the arrival of a key input, the main CPU 1 in this second embodiment is placed in its halt mode consuming a very small amount of power, so that the mean power consumption of the entire system can be reduced.

Third Embodiment

A third embodiment of the information processing system according to the present invention will now be described by reference to FIGS. 1 and 6. The operation of each individual unit in this third embodiment is the same as that in the first embodiment.

Figure 6:
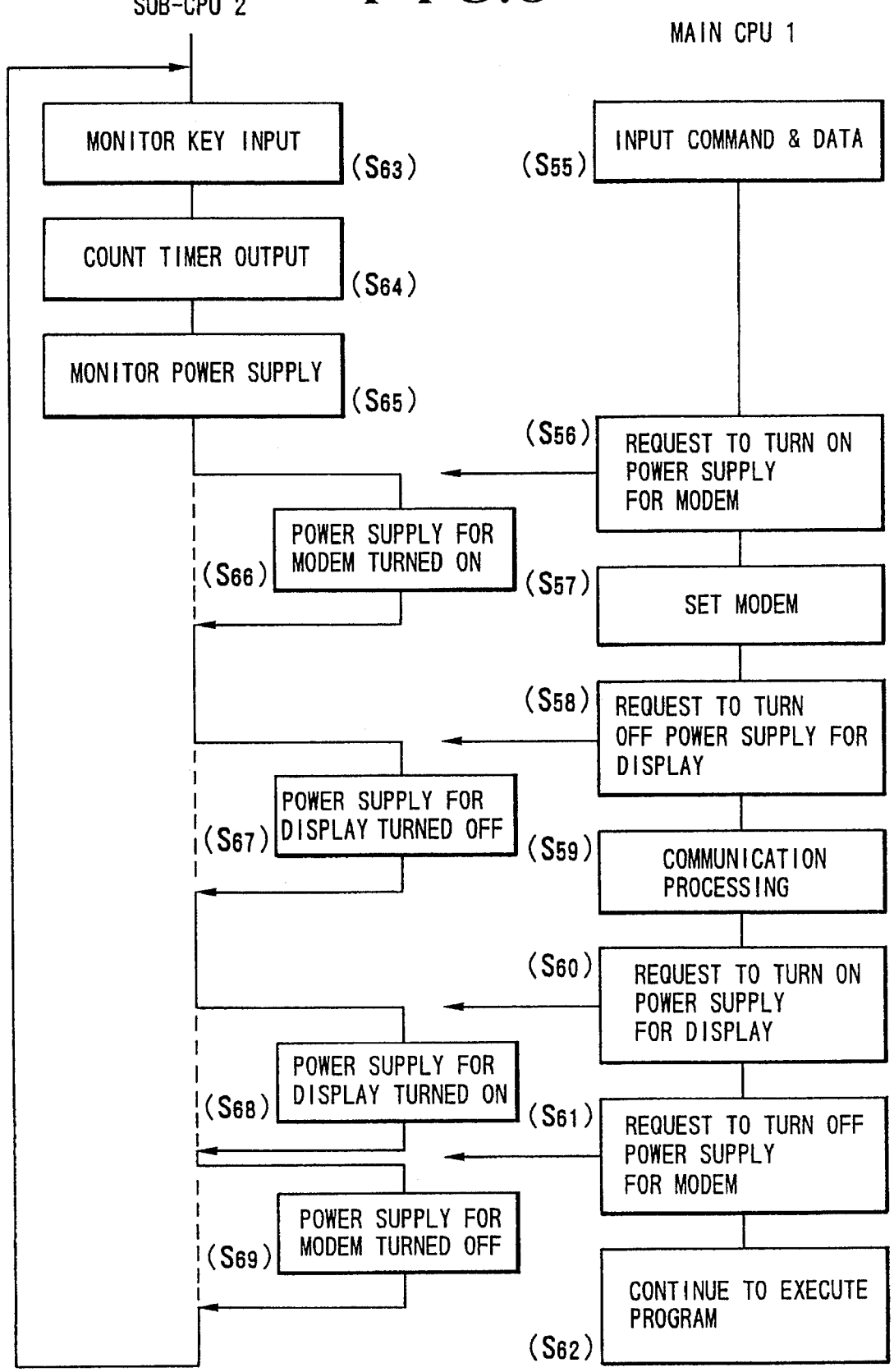
FIG. 6 is a flow chart showing the operation of a third embodiment of the present invention.

FIG. 6 is a flow chart showing the manner of power supply on-off control for each individual input/output unit in the system. In a step S55 in which a command and data input is being processed, the power supply for the display unit 9 is turned on, while the power supply for the modem 10 is turned off. When communication through modem 10 is required, the main CPU 1 requests the sub-CPU 2 to turn on the power supply for the modem 10 in a step S56.

The sub-CPU 2 is repeatedly executing the sequence of routine processing, such as, key input monitoring in a step S63, timer output counting in a step S64 and power supply monitoring in a step S65. As soon as the sub-CPU 2 receives from the main CPU 1 the request for turning on the power supply for the modem 10 in a step S56, the sub-CPU 2 instructs the power supply control circuit 7 to turn on the power supply for the modem 10 in a step S66.

Then, the main CPU 1 instructs the setting of the modem 10 in a step S57 and requests to turn off the power supply for the display unit 9 in a step S58. As soon as the sub-CPU 2 receives the request to turn off the power supply for the display unit 9, the sub-CPU 2 instructs the power supply control circuit 7 to turn off the power supply for the display unit 9 in a step S67.

While the communication processing through the modem 10 is being carried out under control of the main CPU 1 in a step S59, the power supply for the display unit 9 is turned off. Upon completion of the communication processing, the main CPU 1 requests to turn on the power supply for the display unit 9 in a step S60 and requests also to turn off the power supply for the modem 10 in a step S61. Then, the main CPU 1 continues to execute the program in a step S62.

In the meantime, in response to the request from the main CPU 1, the sub-CPU 2 instructs the power supply control circuit 7 to turn on the power supply for the display unit 9 in a step S68 and to turn off the power supply for the modem 10 in a step S69.

It will be seen from the above description of the third embodiment that, during processing of the command and data input, the power supply for the display unit 9 is turned on while turning off the power supply for the modem 10, and that, during data communication, the power supply for the display unit 9 is turned off while turning on the power supply for the modem 10, so that the power consumption of the entire system can be reduced.

In this third embodiment, the display unit 9 and the modem 10 are merely referred to as examples of the input/output units. However, it is apparent that the same applies also to the input/output units, such as, the FDD 11 and the extension slot 12, and, that, by selectively turning on and off the power supply for these units and by turning off the power supply for the unit whose operation is not required, the power consumption of the entire system can be reduced.

It will be understood from the foregoing description that the information processing system of the present invention comprises a main CPU capable of operating at a high speed and a sub-CPU of a type operating at a low speed, driven by a low voltage and consuming a small amount of power, the main CPU and the sub-CPU sharing execution of predetermined kinds of processings respectively. That is, the main CPU executes those kinds of processings required to be executed at a high speed, while the sub-CPU executes those kinds of processings which do not require a high speed and may be executed at time intervals of a short period, thereby lightening the load on the main CPU. Further, the sub-CPU carries out the step of key input monitoring, the step of timer output counting and the step of power supply monitoring and control, and, when awaiting arrival of a key input, the main CPU is placed in its halt mode consuming a very small amount of power, so that the power consumption of the entire system can be reduced without lowering the processing speed. Also, by selectively turning on and off the power supply for the individual input/output units, the power consumption of the entire system can be further reduced.

Thus, the present invention is quite effective in that the total power consumption of an information processing system of a battery driven type, such as, a portable terminal equipment or a portable personal computer, can be reduced without lowering the processing speed of the information processing system.

I claim:

1. An information processing system comprising:

a main CPU having an operation mode in which the main CPU consumes a first amount of power for performing first predetermined processing and a halt mode in which the main CPU consumes a second amount of power which is less than said first amount of power;

a plurality of input/output units including a keyboard, a timer and a display unit;

a sub-CPU, operatively connected to said main CPU and said plurality of input/output units, for performing second predetermined processing including key input monitoring of said keyboard, timer output counting of said timer and power supply monitoring of a power supply;

a memory unit connected to said main CPU and storing programs and data; and a power supply control circuit, connected to said main CPU, said sub-CPU and said plurality of input/output units, for controlling power supply to said plurality of input/output units and said main CPU in response to commands from said sub-CPU, wherein:

said sub-CPU comprises means for placing said main CPU in said halt mode while said sub-CPU is awaiting a key input of said keyboard during said key input monitoring and circuitry for controlling said power supply control circuit to cease power supply to each one of said plurality of input/output units that is not currently in use while said sub-CPU is performing said key input monitoring, said power supply control circuit comprises means for causing initial activation of said sub-CPU in response to turn on of a main power supply, and said sub-CPU further comprises means, responsive to said initial activation, for causing subsequent activation of said main CPU and means, responsive to an OFF-indicating condition of the main power supply, for causing said main CPU to perform termination processing including register saving in said memory unit and, when said termination processing is completed, for controlling said power supply control circuit to turn off power supply to said main CPU and said plurality of input/output units and then to turn off power supply from the main power supply, wherein:

said plurality of input/output units further comprise a modem, a floppy disk drive and an extension slot, and said sub-CPU comprises means for controlling said power supply circuit, in response to receipt from said main CPU of turn on and turn off requests that relate individually to said display unit, said modem, said floppy disk drive and said extension slot and that are associated with input commands and data processing executed by said main CPU, to cause individual turn on and turn off of said display unit, said modem, said floppy disk drive and said extension slot during execution of said input commands and said data processing by said main CPU.

2. An information processing system as in claim 1, wherein said main CPU is directly connected to said display unit, said modem, said floppy disk drive and said extension slot to enable performing at least some of said first predetermined processings during said operation mode.

3. An information processing system as in claim 1, wherein said OFF-indicating condition of the main power supply includes (a) depression of its power supply switch and (b) a drop in power supplied by the main power supply.

4. An information processing system comprising:

a main CPU having an operation mode in which the main CPU consumes a first amount of power for performing first predetermined processing and a halt mode in which the main CPU consumes a second amount of power which is less than said first amount of power;

a plurality of input/output units including a keyboard, a timer and a display unit;

a sub-CPU, operatively connected to said main CPU and said plurality of input/output units, for performing second predetermined processing including key input monitoring of said keyboard, timer output counting of said timer and power supply monitoring of a power supply;

a memory unit connected to said main CPU and storing programs and data; and a power supply control circuit, connected to said main CPU, said sub-CPU and said plurality of input/output units, for controlling power supply to said plurality of input/output units and said main CPU in response to commands from said sub-CPU, wherein:

said sub-CPU comprises means for placing said main CPU in said halt mode while said sub-CPU is awaiting a key input of said keyboard during said key input monitoring and circuitry for controlling said power supply control circuit to cease power supply to each one of said plurality of input/output units that is not currently in use while said sub-CPU is performing said key input monitoring, said power supply control circuit comprises means for causing initial activation of said sub-CPU in response to turn on of a main power supply, and said sub-CPU further comprises means, responsive to said initial activation, for causing subsequent activation of said main CPU and means, responsive to an OFF-indicating condition of the main power supply, for causing said main CPU to perform termination processing including register saving in said memory unit and, when said termination processing is completed, for controlling said power supply control circuit to turn off power supply to said main CPU and said plurality of input/output units and then to turn off power supply from the main power supply, wherein said main CPU includes means for performing, after said subsequent activation, a resume ON check to determine whether said main CPU is to continue a previous processing, and if so, for restoring previous data stored in said memory unit and then resuming said previous processing wherein:

said plurality of input/output units further comprise a modem, a floppy disk drive and an extension slot, and said sub-CPU comprises means for controlling said power supply circuit, in response to receipt from said main CPU of turn on and turn off requests that relate individually to said display unit, said modem, said floppy disk drive and said extension slot and that are associated with input commands and data processing executed by said main CPU, to cause individual turn on and turn off of said display unit, said modem, said floppy disk drive and said extension slot during execution of said input commands and said data processing by said main CPU.

5. An information processing system as in claim 4, wherein said OFF-indicating condition of the main power supply includes (a) depression of its power supply switch and (b) a drop in power supplied by the main power supply.

* * * * *